(12) United States Patent
Lakshmanamurthy et al.

(10) Patent No.: US 7,707,266 B2
(45) Date of Patent: *Apr. 27, 2010

(54) SCALABLE, HIGH-PERFORMANCE, GLOBAL INTERCONNECT SCHEME FOR MULTI-THREADED, MULTIPROCESSING SYSTEM-ON-A-CHIP NETWORK PROCESSOR UNIT

(75) Inventors: Sridhar Lakshmanamurthy, Sunnyvale, CA (US); Mark B. Rosenbluth, Uxbridge, MA (US); Matthew Adiletta, Bolton, MA (US); Jeen-Xuan Miin, Palo Alto, CA (US); Bijoy Bose, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1554 days.

This patent is subject to a terminal disclaimer.

(21) Appl. No.: 10/997,624

(22) Filed: Nov. 23, 2004

(65) Prior Publication Data

US 2006/0112206 A1 May 25, 2006

(51) Int. Cl.
*G06F 13/00* (2006.01)
*G06F 15/173* (2006.01)
*G06F 15/16* (2006.01)

(52) U.S. Cl. .............. 709/217; 710/110; 710/111; 710/112; 710/113; 370/412; 370/462

(58) Field of Classification Search ......... 709/217–228; 710/110–113, 317, 243; 370/412, 462
See application file for complete search history.

(56) References Cited

U.S. PATENT DOCUMENTS 6,041,400 A    3/2000    Ozcelik et al.

(Continued)

FOREIGN PATENT DOCUMENTS

EP    1 284 459 A2    2/2003

(Continued)

OTHER PUBLICATIONS

PCT/US2005/041182, International Preliminary Report on Patentability, May 30, 2007, p. 1.

(Continued)

*Primary Examiner*—Haresh N Patel
(74) *Attorney, Agent, or Firm*—Blakely, Sokoloff, Taylor & Zafman LLP

(57) ABSTRACT

A scalable, high-performance interconnect scheme for a multi-threaded, multi-processing system-on-a-chip network processor unit. An apparatus implementing the technique includes a plurality of masters configured in a plurality of clusters, a plurality of targets, and a chassis interconnect that may be controlled to selectively connects a given master to a given target. In one embodiment, the chassis interconnect comprises a plurality of sets of bus lines connected between the plurality of clusters and the plurality of targets forming a cross-bar interconnect, including sets of bus lines corresponding to a command bus, a pull data bus for target writes, and a push data bus for target reads. Multiplexer circuitry for each of the command bus, pull data bus, and push data bus is employed to selectively connect a given cluster to a given target to enable commands and data to be passed between the given cluster and the given target.

26 Claims, 14 Drawing Sheets

U.S. PATENT DOCUMENTS

| | | | |
|---|---|---|---|
| 6,842,104 B1 | 1/2005 | Osaka et al. | |
| 7,200,699 B2* | 4/2007 | Bose et al. | 710/120 |
| 7,412,551 B2* | 8/2008 | Bose et al. | 710/120 |
| 2003/0163555 A1* | 8/2003 | Battou et al. | 709/223 |
| 2004/0199706 A1 | 10/2004 | Phelps et al. | |
| 2006/0002412 A1* | 1/2006 | Bose et al. | 370/412 |
| 2006/0047873 A1* | 3/2006 | Bose et al. | 710/243 |
| 2006/0095730 A1* | 5/2006 | Wolrich et al. | 712/215 |
| 2006/0221980 A1* | 10/2006 | Bose et al. | 370/400 |

FOREIGN PATENT DOCUMENTS

| | | |
|---|---|---|
| JP | 2000-163384 A | 6/2000 |
| JP | 2000-339269 A | 12/2000 |
| WO | WO 00/25250 | 5/2000 |

OTHER PUBLICATIONS

PCT/US2005/041182, Written Opinion of the International Searching Authority, May 30, 2007, pp. 1-6.

PCT/US2005/041182, Apr. 7, 2006, International Search Report.

Intel, "Intel ® IXP1200 Network Processor Family," Hardware Reference Manual, ftb://download.intel.com/design/network/manuals/27830309.pdf, Dec. 7, 2001, pp. 15-48.

Intel, "Intel ® IXB3208 Bus Scaling Fabric," Datasheet, http://www.caps1.udel.edu/{fchen/projects/np/docs/manual/volumnl/IXB3208%20Datasheet.pdf, May 1, 2001, pp. 7-40.

Allen Jr., J. R. et al., "IBM PowerNP Network Processor: Hardware, Software, and Applications," IBM Journal of Research and Development, New York, NY USA, May 2003, vol. 47, No. 2-3, pp. 177-193, May 31, 2003.

* cited by examiner

SCALABLE, HIGH-PERFORMANCE, GLOBAL INTERCONNECT SCHEME FOR MULTI-THREADED, MULTIPROCESSING SYSTEM-ON-A-CHIP NETWORK PROCESSOR UNIT

FIELD OF THE INVENTION

The field of invention relates generally to network equipment and, more specifically but not exclusively relates a scalable, high-performance interconnect scheme for a multi-threaded, multi-processing system-on-a-chip device, such as a network processor unit.

BACKGROUND INFORMATION

Network devices, such as switches and routers, are designed to forward network traffic, in the form of packets, at high line rates. One of the most important considerations for handling network traffic is packet throughput. To accomplish this, special-purpose processors known as network processors have been developed to efficiently process very large numbers of packets per second. In order to process a packet, the network processor (and/or network equipment employing the network processor) needs to extract data from the packet header indicating the destination of the packet, class of service, etc., store the payload data in memory, perform packet classification and queuing operations, determine the next hop for the packet, select and appropriate network port via which to forward the packet, etc. These operations are generally referred to as "packet processing" operations.

Modern network processors perform packet processing using multiple multi-threaded processing elements (referred to as microengines in network processors manufactured by Intel® Corporation, Santa Clara, Calif.), wherein each thread performs a specific task or set of tasks in a pipelined architecture. During packet processing, numerous accesses are performed to move data between various shared resources coupled to and/or provided by a network processor. For example, network processors commonly store packet metadata and the like in static random access memory (SRAM) stores, while storing packets (or packet payload data) in dynamic random access memory (DRAM)-based stores. In addition, a network processor may be coupled to cryptographic processors, hash units, general-purpose processors, and expansion buses, such as the PCI (peripheral component interconnect) and PCI Express bus.

In general, the various packet-processing elements (e.g., microengines) of a network processor, as well as other optional processing elements, such as general-purpose processors, will share access to various system resources. Such shared resources typically include data storage and processing units, such as memory stores (e.g., SRAM, DRAM), hash units, cryptography units, etc., and input/output (I/O) interfaces. The shared resources and their consumers are interconnected via sets of buses known as the "chassis." The chassis is a high-performance interconnect on the network processor chip that provides the on-chip data transport infrastructure between numerous processing elements on the chip and the numerous shared resources on-chip or accessible via appropriate built-in chip interfaces.

Under typical network processor configurations, various bus schemes are employed to enable shared access to the shared resources. Since only a single set of signals can be present on a given bus at any point in time, buses require multiplexing and the like to allow multiple resource consumers to access multiple resource targets coupled to the bus. One technique for relieving access contention is to provide separate buses for data reads and data writes for each target. As used herein, these buses are known as push buses (for reads), and pull buses (for writes). (It is noted that terms push and pull are from the perspective of the shared resource target.) However, implementing separate buses for reads and writes for each target increases the bus count, and thus adds to the already crowded signal routing requirements for the network processor chip. Consider, under a conventional approach, sharing access to 16 shared resources requires 16 independent sets of buses, with each set of buses including a read bus, a write bus, and a command bus for a total of 48 buses. To support routing for such a large number of buses, dies sizes must be increased; this directly conflicts with the goal of reducing dies sizes and processor costs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of a scalable, high-performance interconnect scheme for a multi-threaded, multi-processing system-on-a-chip network processor unit are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

According to one aspect of the embodiments described herein, a scalable chassis interconnect infrastructure based on principles of a cross-bar architecture is implemented to enable access to a large number of shared resources without requiring individual bus sets for each shared resource. The chassis supports transactions between two types of agents: masters and targets. In one embodiment, the masters are organized into groups ("clusters") that share common bus infrastructure. The chassis also comprises a set of high performance buses, including command buses that move commands from masters to targets, and respective sets of push and pull data and request identifier (ID) buses.

Figure 1:
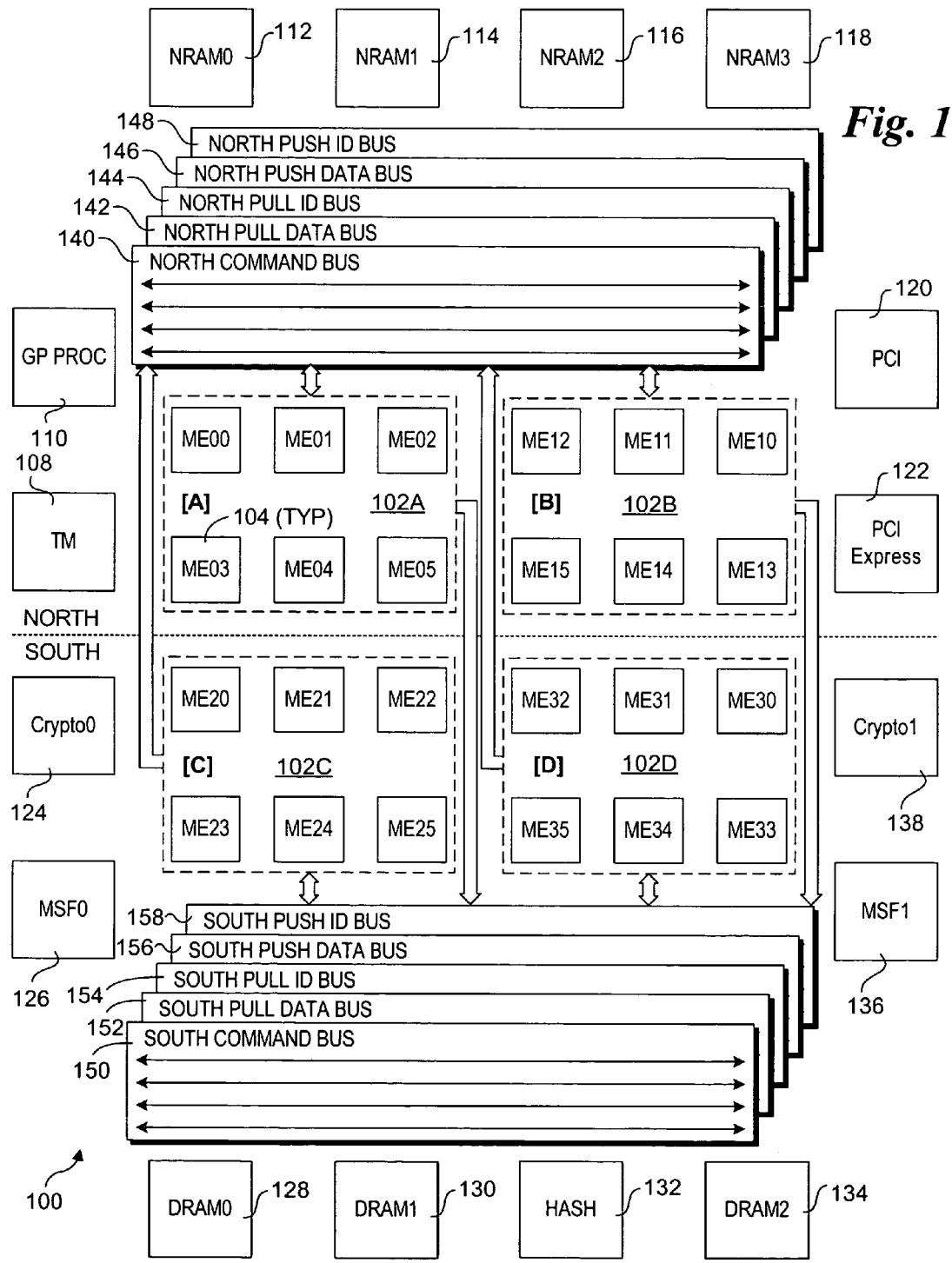
FIG. 1 is a schematic diagram of a network processor architecture in which multiple clusters, each including multiple masters, are connected to multiple shared target resources (targets) via a chassis interconnect including multiple buses having crossbar configurations, according to one embodiment of the invention.

FIG. 1 shows a network processor architecture 100 that implements one embodiment of the aforementioned chassis interconnect. At the heart of the architecture are four processing element clusters 102A, 102B, 102C, and 102D. (For convenience, the clusters are also labeled [A], [B], [C], and [D] in the figures herein, so as to more easily identify relationship between the clusters and various bus components having a reference number that includes a suffix having a value of one of A, B, C, or D.) In the illustrated embodiment, each of processing element clusters 102A-D includes six packet-processing microengines (MEs) 104. In other embodiments, each processing element cluster may include a different number of microengines, such as, but not limited to, four or eight microengines. Generally, each microengine comprises a RISC (reduced instruction set computer) processing core, with network processor architecture 100 including multiple processing cores on a common die.

The embodiment of FIG. 1 shows various exemplary shared resource targets that are generally located around the periphery of network processor architecture 100. In turn, the shared resources are grouped at a first level to bus sets located toward the top and bottom of FIG. 1. The targets shown toward the top of FIG. 1, which are referred to as the "north" targets include a traffic manager (TM) 108, a general-purpose processor (GP-Proc) 110, narrow random access memory (NRAM) control channels 112, 114, 116, and 118, a PCI (Peripheral Component Interconnect) interface 120, and a PCI Express interface 122. In general, an NRAM control channel is illustrative of a control channel that provides access control to various types of memory stores comprising narrow RAM devices, such as, but not limited to SRAM, Rambus DRAM (RDRAM), Quad Data-Rate (QDR) RAM, etc. The targets shown toward the bottom of FIG. 1, which are referred to as the "south" targets, include a first cryptographic (Crypto0) unit 124, a first media switch fabric (MSF0) interface 126, DRAM control channels 128 and 130, a hash unit 132, a DRAM control channel 134, a second media switch fabric (MSF1) interface 136, and a second cryptographic (Crypto1) unit 138.

In general, architecture 100 represents a logic architecture, wherein the physical location of the various elements may vary from where they are shown in the Figures herein. However, in one embodiment the general location of the targets and masters on a physical device are similar to that shown in FIGS. 1 and 8, with the targets being generally located around the periphery of the device, while the masters are disposed toward the center of the device.

Architecture 100 includes two sets of buses connecting the clusters 102A-D to the various shared resource targets. In one embodiment, each set of buses includes a command bus and two sets of data buses—a push bus for read data, and a pull bus for write data. Thus, each cluster has two independent command buses and two sets of data buses. Additionally, in one embodiment the sets of buses further include associated tag buses (ID buses) for assisting transfer of data to/from the masters and targets.

The buses employed for the north targets located at the top of architecture 100 include a north command bus 140, a north pull data bus 142, a north pull ID bus 144, a north bus data bus 146, and a north push ID bus 148. The buses employed for the south targets located at the bottom of architecture 100 include a south command bus 150, a south pull data bus 152, a south pull ID bus 154, a south push data bus 156, and a south push ID bus 158.

Figure 2A:
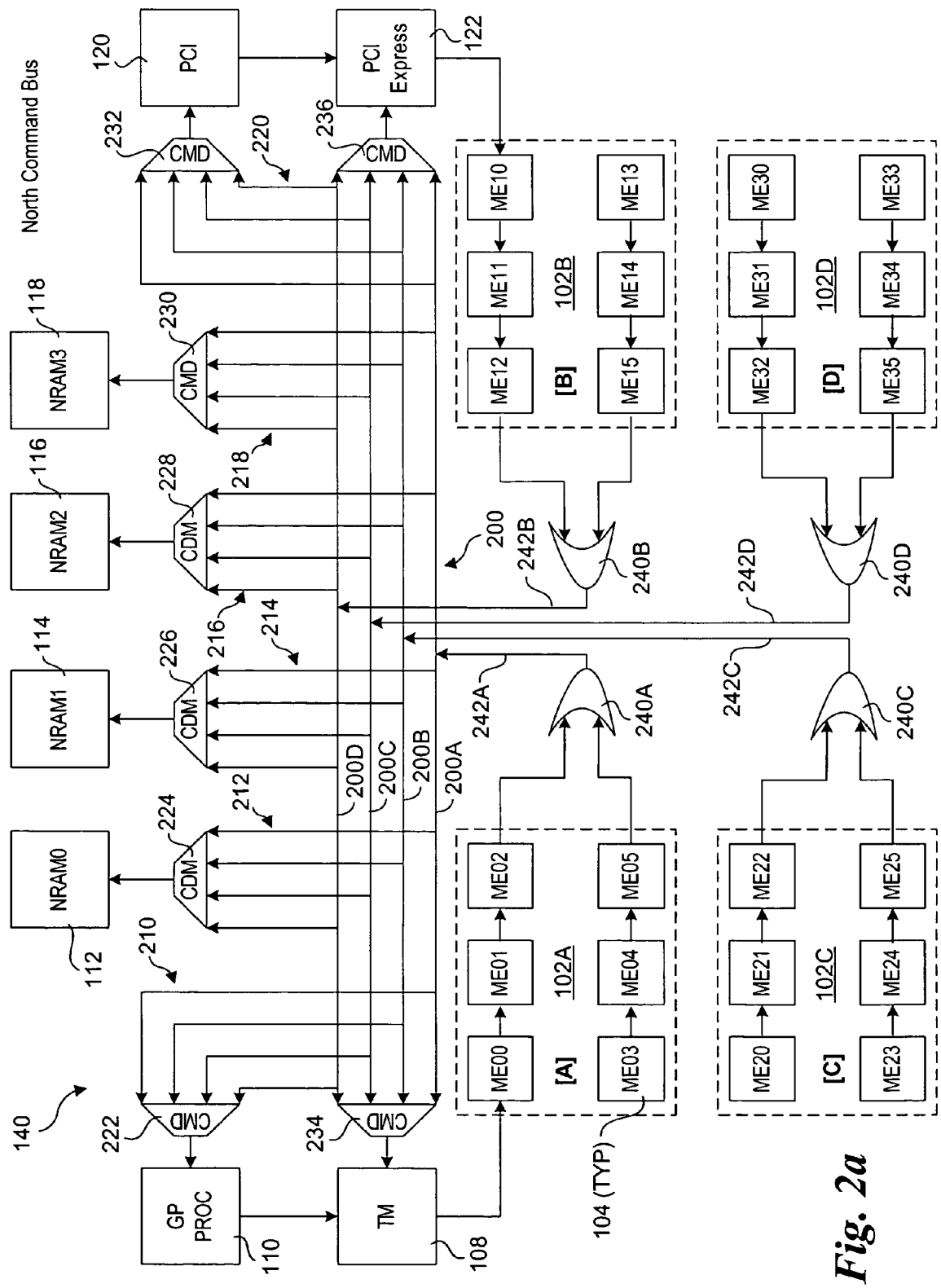
FIG. 2a is a schematic diagram illustrating details of a north command bus, according to one embodiment of the invention.

FIG. 2A shows details of north command bus 140, according to one embodiment. The north command bus employs a cross-bar configuration, where each target is connected to sets of bus lines via a respective multiplexer (also commonly referred to as a "mux"). This supports selective connections between each target and each cluster, which may be configured based on the routing provided by controlling the configuration of the various multiplexers.

The north command bus 140 circuitry includes a set of horizontal bus lines 200, including bus lines 200A, 200B, 200C, and 200D. It will be understood that each bus line represents a set of signal lines corresponding to a respective bus, rather than a single signal. The width of each bus is dependent on the particular requirements of the network processor implementation. Respective sets of cross-bar buses (depicted as bus lines) are coupled between horizontal bus line set 200 and a respective target via a respective command multiplexer. The cross-bar buses include cross-bar buses 210, 212, 214, 216, 218, and 220, while the multiplexers include command (CMD) multiplexer 222, 224, 226, 228, 230, and 232. Additionally, command multiplexers 234 and 236 are connected at opposite ends of horizontal bus line set 200.

In one embodiment, the number of buses (depicted as bus lines) in a bus line set is equal to the number of clusters in the architecture. For example, in the figures illustrated herein, the network processor architecture includes four clusters. Thus, the number of bus lines depicted for each bus line set is four, indicating there would be four sets of buses. In other embodiments (not shown), the network processor architecture may include other numbers of clusters, such as six, for example. In this case, each bus line set would include six bus lines depicting six sets of buses. In general, the number of bus lines (and thus buses) in a cross-bar bus is equal to the number of bus lines in the horizontal bus to which it is coupled.

The cross-bar bus architecture of north command bus 140 supports a two-stage arbitration scheme. The arbitration scheme is used to selectively connect a given master to a designated target to enable a command to be sent from the master to the target. The first stage is used to select a master from a given cluster, while the second stage is used to select the designated target from among all of the north targets. The outcome of the first arbitration stage, also referred to herein as intra-cluster arbitration, for each of clusters 102A, 102B, 102C, and 102D is depicted as respective OR gates 240A, 240B, 240C, and 240D. The OR gate representation is used to indicate that if any of the masters for a given cluster initiate a target transaction request, the process for arbitrating a request for the entire cluster is initiated. The north target command output stage of each cluster is connected to a corresponding bus line in bus line set 200 via a respective cross-bar bus. These include cross-bar buses 242A, 242B, 242C, and 242D.

In the illustrated embodiment, transactions requests are forwarded between masters in a given cluster using a pipelined scheme. This pipelined design takes advantage of the multithreaded approach used for performing packet-processing used by modern network processors. Thus, a target transaction request is passed from one master to the next master in the pipeline until it reaches the output stage for the cluster. Upon winning intra-cluster arbitration at the output stage and cluster arbitration (i.e., arbitration between concurrent requests issued from multiple clusters), a command is placed on the horizontal bus line corresponding to the cluster.

Another concept illustrated in FIG. 2*a* is the ability for a target to operate as both a target and as a master. For example, each of general purpose processor 110, traffic manager 108, PCI interface 120, and PCI Express interface 122 may operate as both a target and a master. Additional pipelined stages are employed to route a target transaction request from one of general purpose processor 110 or traffic manager 108 via cluster 102A, and to route a target transaction request from one of PCI interface 120 or PCI Express interface 122 via cluster 102B, as illustrated in FIG. 2*a*.

Figure 2B:
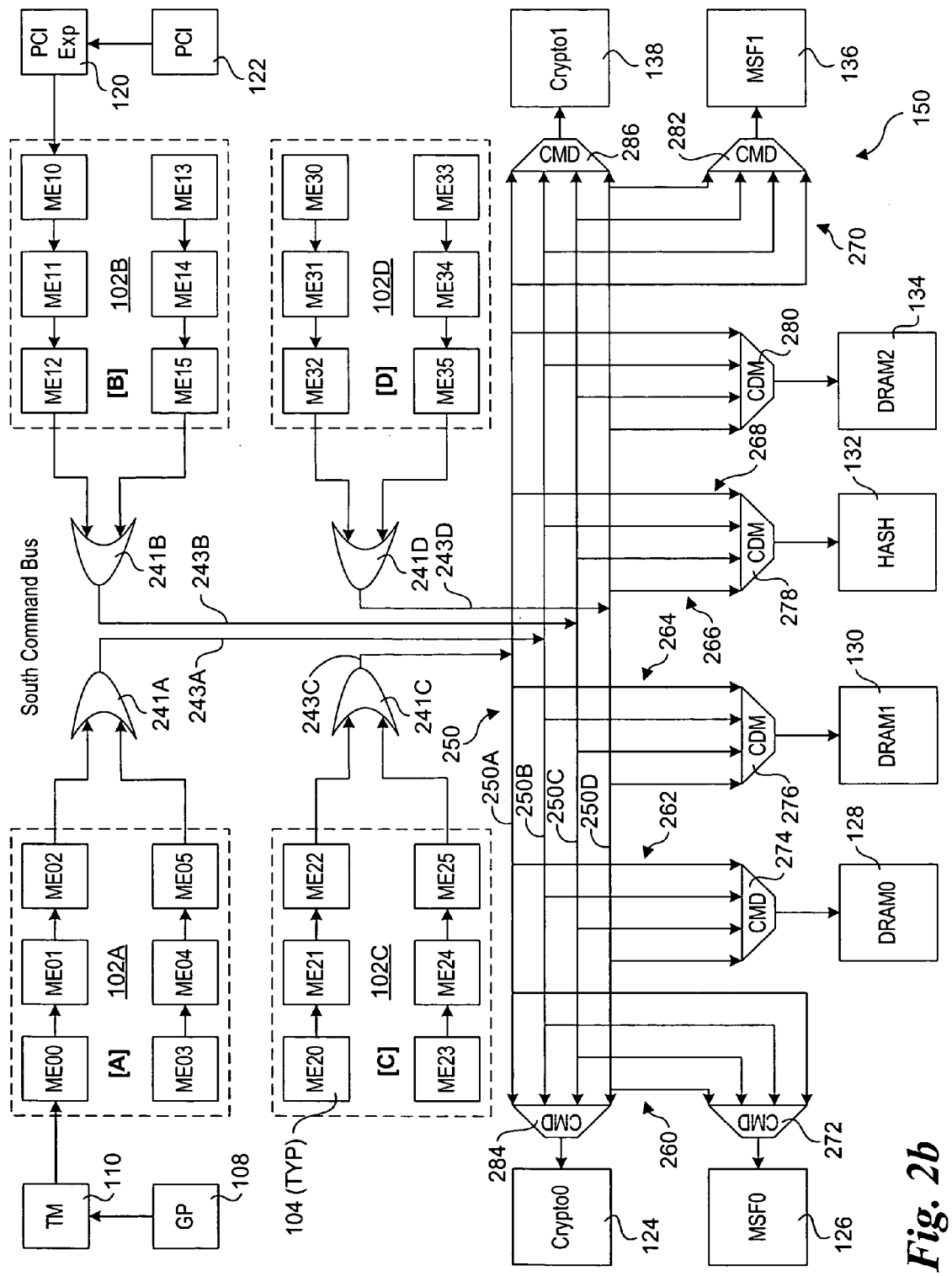
FIG. 2b is a schematic diagram illustrating details of a south command bus, according to one embodiment of the invention.

As illustrated in FIG. 2*b*, the bus architecture for south command bus 150, according to one embodiment, is analogous to the architecture for north command bus 140 shown in FIG. 2*a*. The bus architecture includes a horizontal bus line set 250 including bus lines 250A, 250B, 250C, and 260D. As with the north command bus architecture, respective cross-bar bus line sets are disposed between horizontal bus line set 150 and the various south targets via respective command multiplexers. These include cross-bar bus line sets 260, 262, 264, 266, 268, and 270, and command multiplexers 272, 274, 276, 278, 280, and 282. Additionally, command multiplexers 284 and 286 are connected at respective ends of bus line set 250 to couple the first and second cryptography units 124 and 138 to the bus line set.

As discussed above, the north and south command bus architectures enable any master to access any target, regardless of whether that target is a north target or a south target. Furthermore, this extends to masters that may also operate as targets, even if the master/target is not on the same north or south region as the target that is to be accessed via a corresponding command that is routed to that target via the combined north and south command bus architecture. For example, a component operating as both a north target and master may access a south target.

In one embodiment, respective intra-cluster arbitration operations for commands issued by masters that are members of a given cluster (or by external master/target components that are associated with that cluster) are performed for each of the north and south target groups. The result of the intra-cluster arbitration for the south target commands is depicted by OR gates 241A, 241B, 241C, and 241D in FIG. 2*b*. Meanwhile, the south target command output stage of each cluster is connected to a corresponding bus line in bus line set 250 via a respective cross-bar bus. These include cross-bar buses 243A, 243B, 243C, and 243D. Thus, in one embodiment, respective commands may be sent to designated targets from among the north and south target groups in a concurrent manner.

Figure 3A:
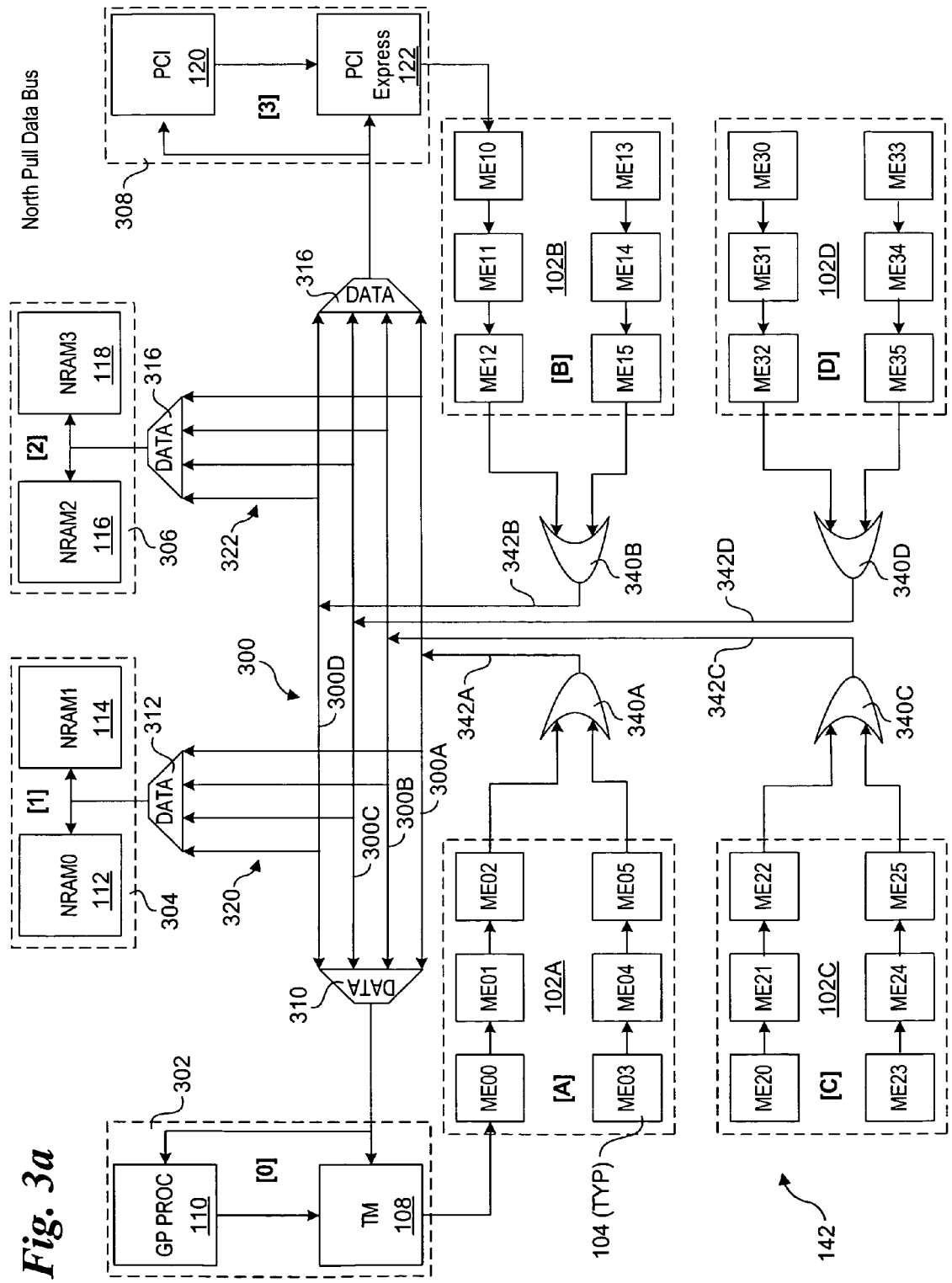
FIG. 3a is a schematic diagram illustrating details of a north pull data bus, according to one embodiment of the invention.

Details of north pull data bus 142, according to one embodiment, are illustrated in FIG. 3*a*. As with the command buses, the north pull data bus employs a cross-bar configuration including a horizontal bus line set 300 including bus lines 300A, 300B, 300C, and 300D. Also as before, each of clusters 102A, 102B, 102C, and 102D may produce an intra-cluster arbitration winner for each of the north and south pull data buses. Thus, north pull data bus 142 includes OR gates 340A, 340B, 340C, and 340D, which are connected to cross-bar bus lines 342A, 342B, 342C, and 342D, respectively.

A key challenge in such a high performance interconnect scheme is to achieve high utilization and bounded average latency on the buses such that the delivered bandwidth on the interconnect tracks very closely to the peak bandwidth provisioned for the interconnect. As discussed above, due to die-size limitations, the number of targets typically exceeds the number of available intra-chip data routing buses. According to one embodiment, this issue is addressed by grouping multiple targets into sub-groups that share a common data-bus track.

Accordingly, in the illustrated embodiment of FIG. 3*a*, the various north targets are further grouped into target sub-groups 302 (sub-group [0]), 304 (sub-group [1]), 306 (sub-group [2]), and 308 (sub-group [3]). (Each sub-group in the remaining figures is also assigned a logical value from [0] to [N−1], where N equals the number of clusters.) In one embodiment, each sub-group includes targets having similar access characteristics. In turn, each of sub-groups 304 and 306 is connected to horizontal bus line set 200 via a respective sub-group data multiplexer and cross-bar bus line set. These components include sub-group data multiplexers 304 and 306, and cross-bar bus line sets 320 and 322. Meanwhile, sub-groups 302 and 308 are connected to horizontal bus line set 300 via sub-group data multiplexers 310 and 316.

Figure 3B:
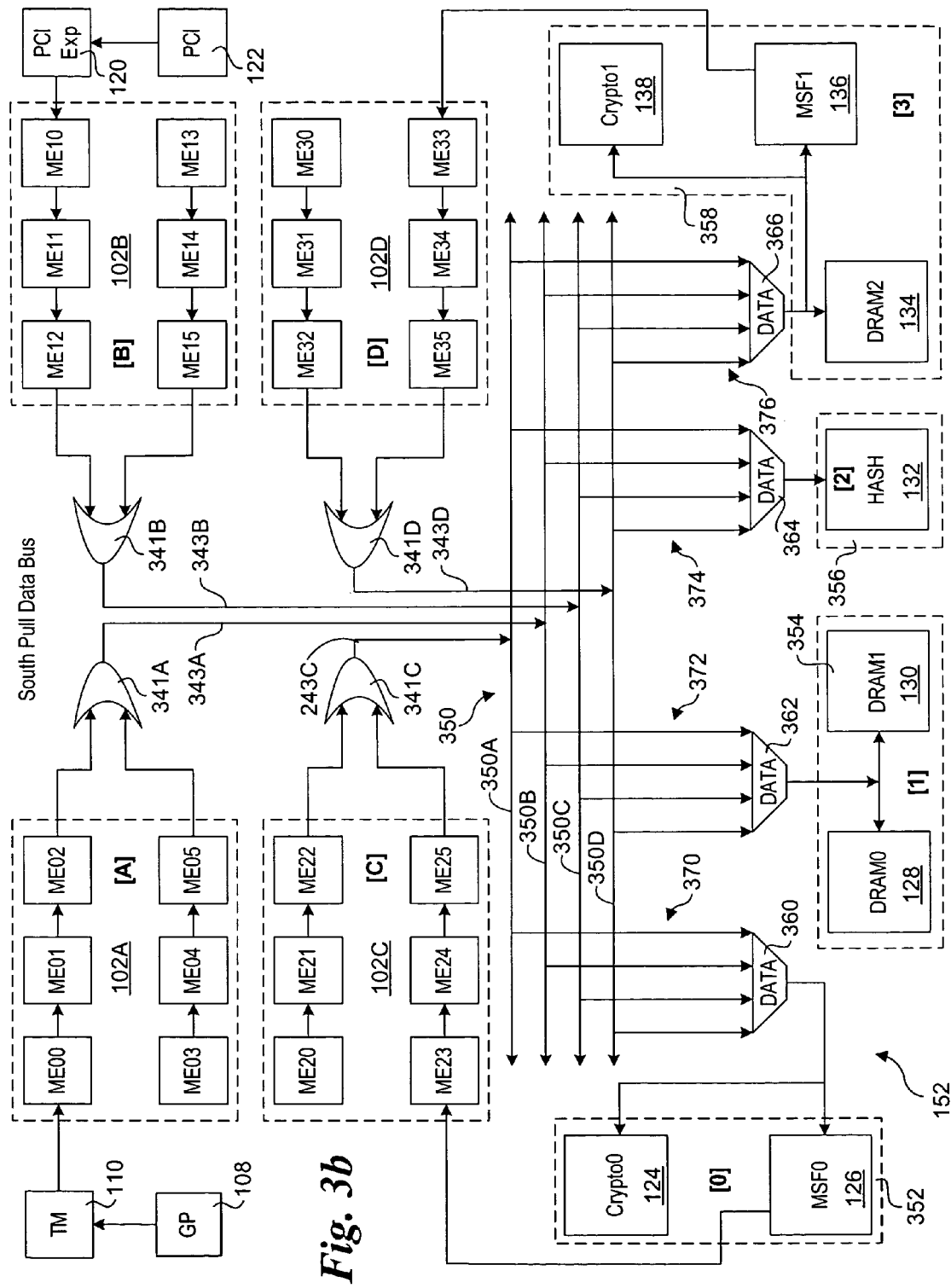
FIG. 3b is a schematic diagram illustrating details of a south pull data bus, according to one embodiment of the invention.

As illustrated in FIG. 3*b*, one embodiment of south pull data bus 152 employs target sub-grouping in a manner analogous to that employed for the north pull data bus discussed above. In the illustrated embodiment, the south target sub-groups include sub-groups 352, 354, 356, and 358. The pull data bus configuration for south pull data bus 152 is also analogous to the north pull data bus, employing a horizontal bus line set 350, including bus lines 350A, 350B, 350C, and 350D. These bus lines are connected to sub-group data multiplexers 360, 362, 364, and 366 via respective cross-bar bus line sets 370, 372, 374, and 376.

In one embodiment, respective intra-cluster arbitration operations corresponding to pull data transaction for masters that are members of a given cluster (or by external master/target components that are associated with that cluster) are performed for each of the north and south target groups. The result of the intra-cluster arbitration for the south target pull data bus is depicted by OR gates 341A, 341B, 341C, and 341D in FIG. 3b. Meanwhile, the south pull data bus output stage of each cluster is connected to a corresponding bus line in bus line set 350 via a respective cross-bar bus. These include cross-bar buses 343A, 343B, 343C, and 343D. Thus, in one embodiment, respective pull data transactions to transfer data from masters to designated targets from among the north and south target groups may be performed in a concurrent manner.

In another embodiment, the north pull data bus has a configuration analogous to the north command bus, while the south pull data bus has a configuration analogous to the south command bus (both not shown). In these embodiments, the north and south targets groups are not further grouped into sub-groups.

Figure 4A:
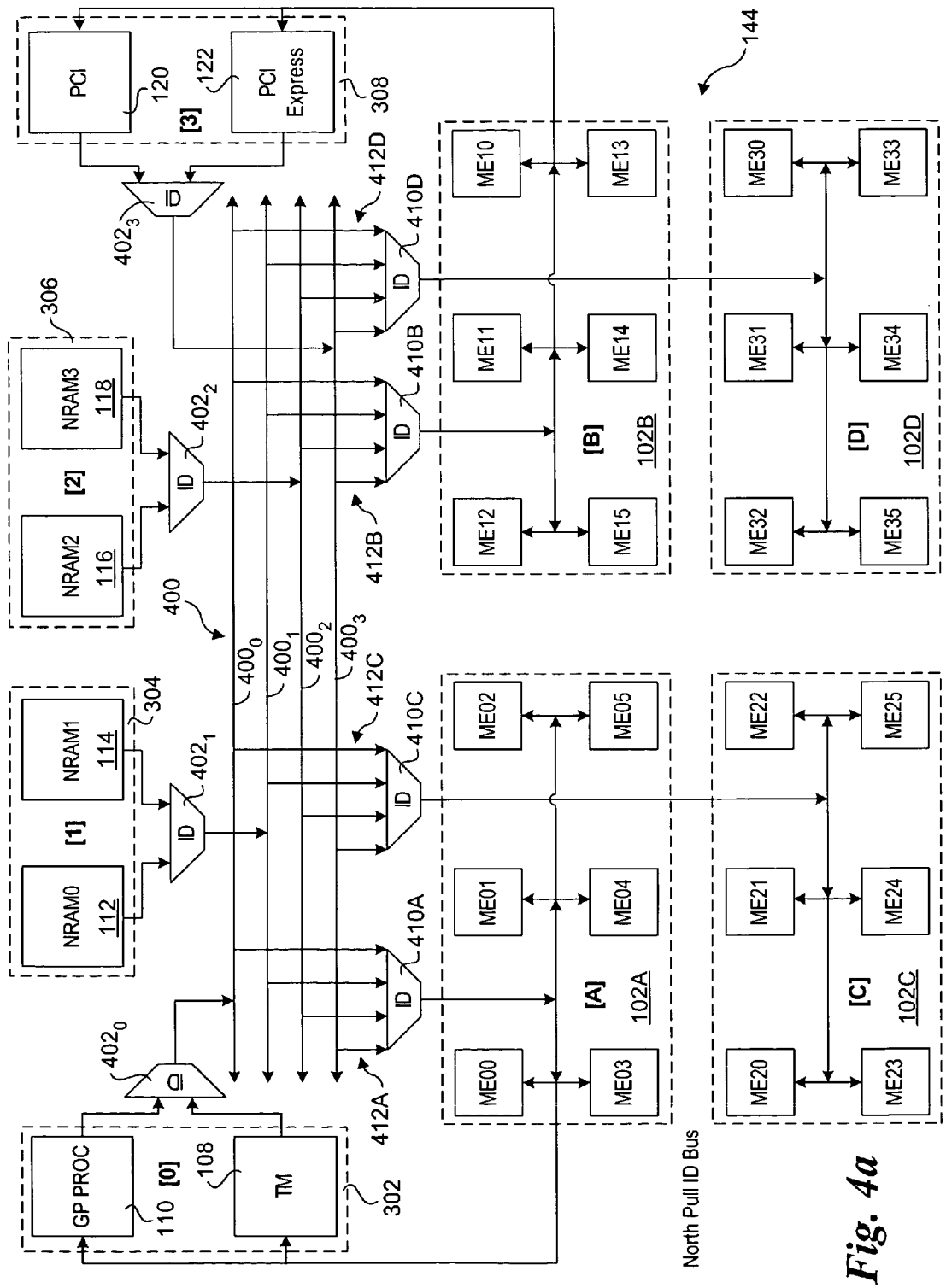
FIG. 4a is a schematic diagram illustrating details of a north pull requester identifier (ID) bus, according to one embodiment of the invention.
Figure 4B:
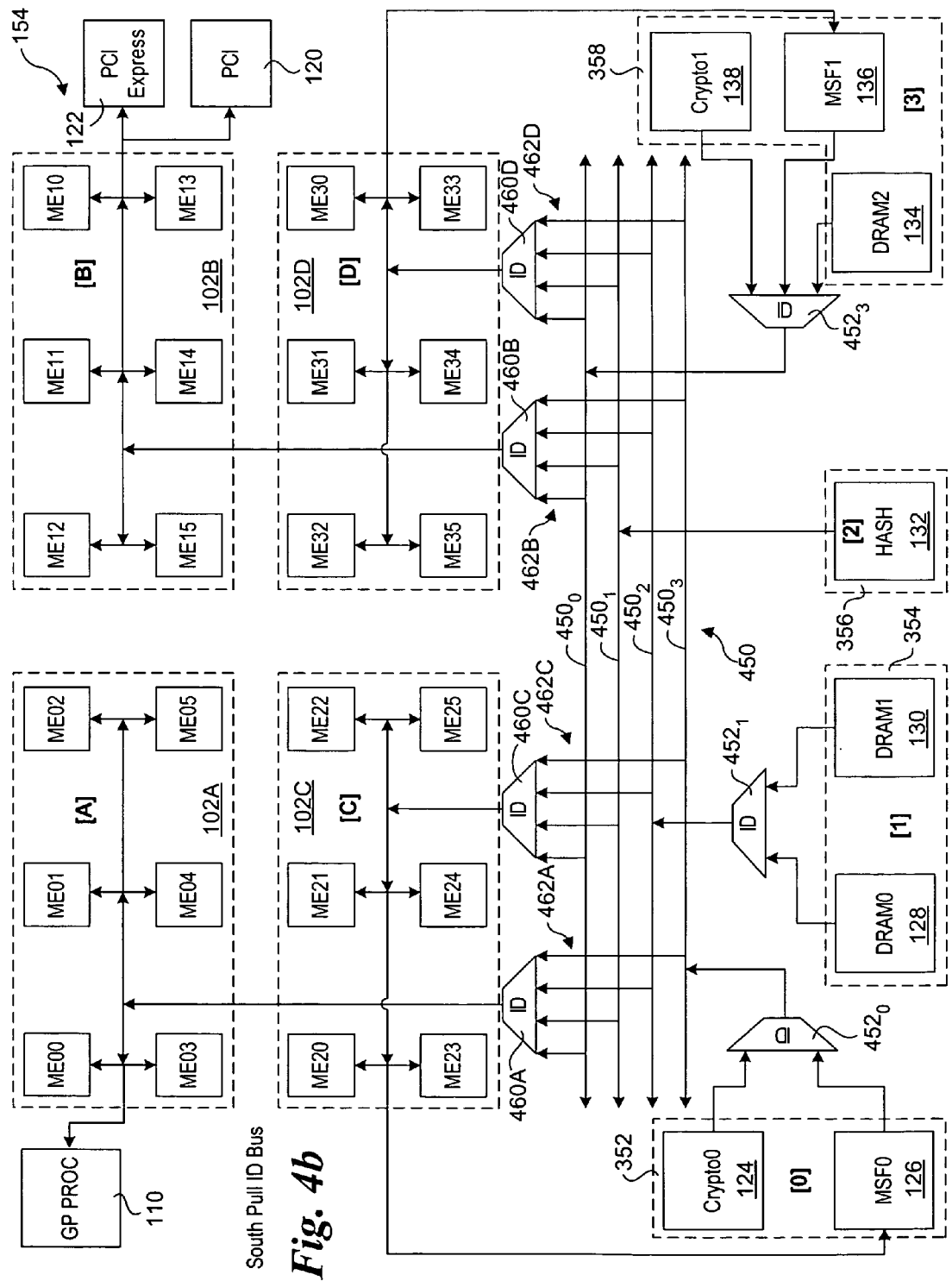
FIG. 4b is a schematic diagram illustrating details of a south pull ID bus, according to one embodiment of the invention.

Exemplary embodiments of north and south pull ID buses 144 and 154 are shown in FIGS. 4a and 4b, respectively. In the illustrated embodiments, the various targets are further grouped into sub-groups in a similar manner to that discussed above for the north and south pull data buses. Generally, the sub-grouping used for a pull data and ID bus set should match, although this is not a strict requirement. The general configuration of the north and south pull ID buses are likewise analogous to those presented above, wherein multiple cross-bar buses are connected to a set of horizontal bus lines. More particularly, the embodiment of north pull ID bus 144 shown in FIG. 4a employs a horizontal bus line set 400 including bus lines $400_0$, $400_1$, $400_2$, and $400_3$, while the embodiment of south pull ID bus 154 shown in FIG. 4b employs a horizontal bus line set 450 including bus lines $450_0$, $450_1$, $450_2$, and $450_3$.

Each of the north and south pull ID buses employ a two-stage arbitration scheme, including a sub-group arbitration stage and cluster arbitration stage. The sub-group arbitration stage is used to determine which member of the group is allowed access to the pull ID bus. The cluster arbitration stage is used to determine which winning sub-group is allowed access to the cluster to which the master half of the transaction belongs.

In connection with the first stage arbitration operations, a respective sub-group ID multiplexer is provided for each sub-group. These include sub-group ID multiplexers $402_0$, $402_1$, $402_2$, and $402_3$ for the north target sub-groups, and sub-group ID multiplexers $452_0$, $452_1$, and $452_3$ for the south target sub-groups. In connection with the second level arbitration operations, a respective sub-group selection ID multiplexer is provided to connect a winning sub-group to a corresponding cluster. These include sub-group selection ID multiplexers 410A, 410B, 410C, and 410D for the north target sub-groups, and sub-group selection ID multiplexers 460A, 460B, 460C, and 460D for the south target sub-groups.

Each of the horizontal bus lines is connected to each of the sub-group selection ID multiplexers via respective sets of cross-bar bus lines. These include cross-bar bus line sets 412A, 412B, 412C, and 412D for horizontal bus line set 400 (FIG. 4a) and cross-bar bus line sets 462A, 462B, 462C, and 462D for horizontal bus line set 450 (FIG. 4b).

Figure 5A:
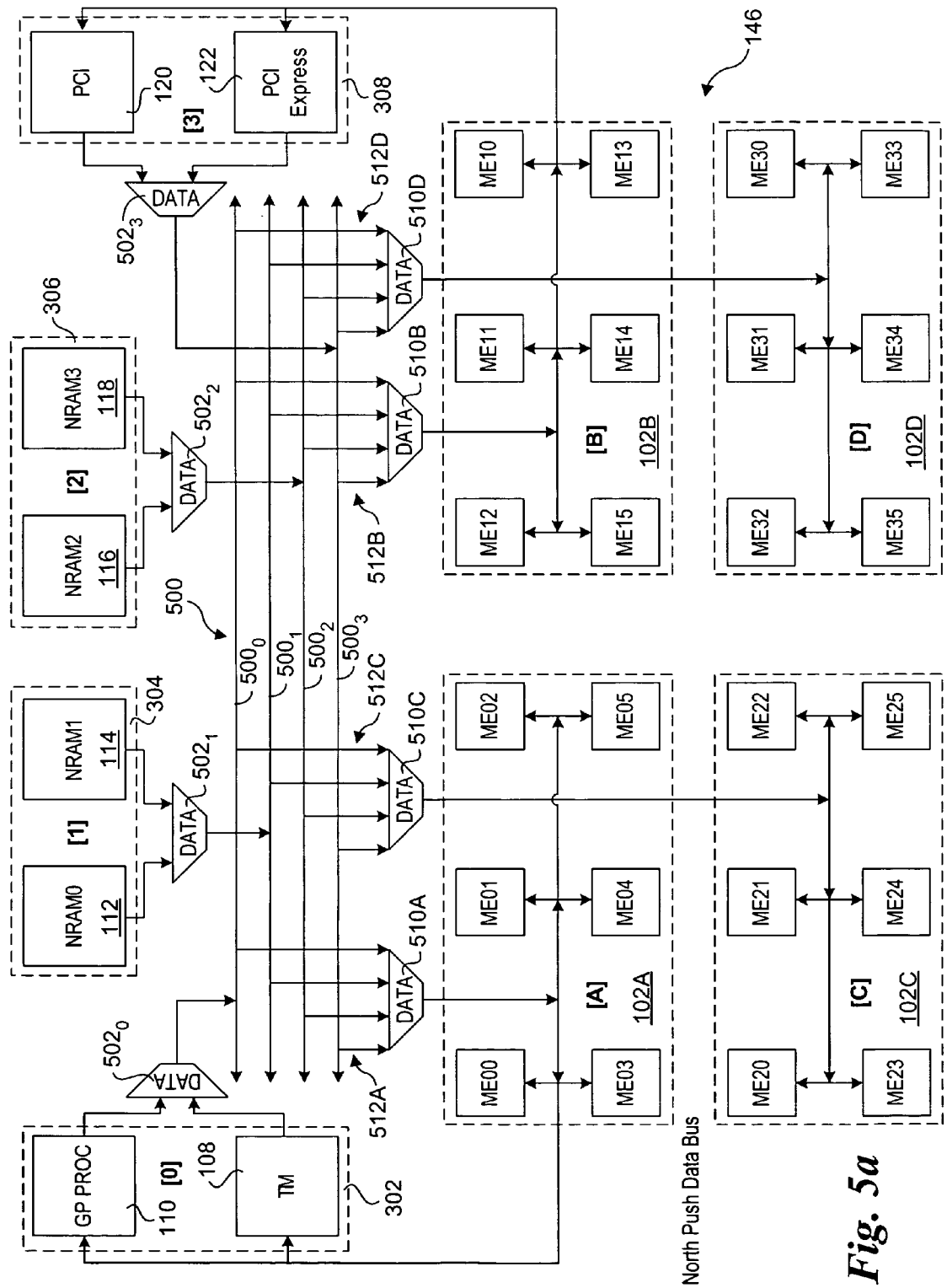
FIG. 5a is a schematic diagram illustrating details of a north push data bus, according to one embodiment of the invention.
Figure 5B:
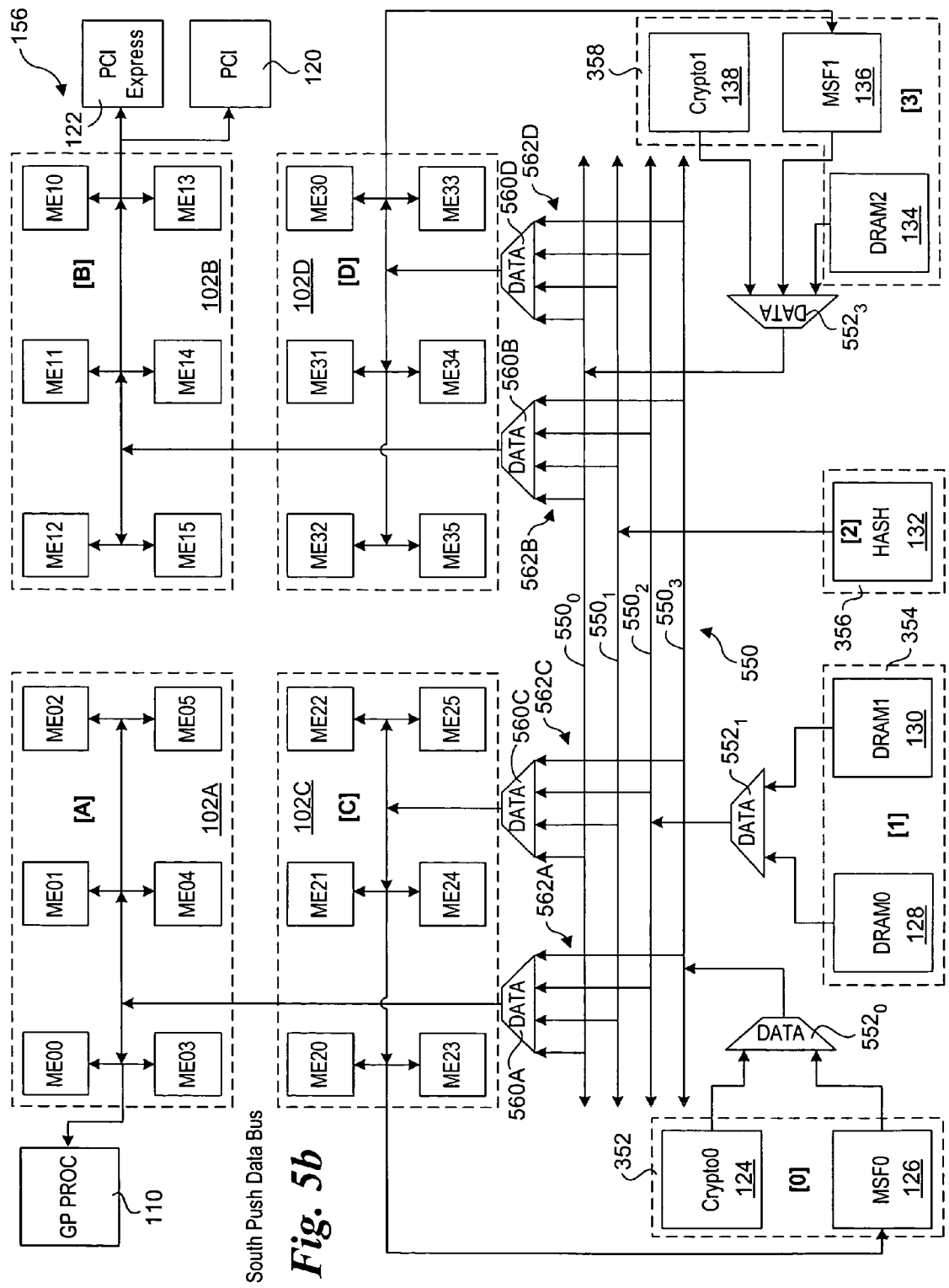
FIG. 5b is a schematic diagram illustrating details of a south push data bus, according to one embodiment of the invention.

Exemplary embodiments of north and south push data buses 146 and 156 are shown in FIGS. 5a and 5b. In the illustrated embodiments, the various targets are further grouped into sub-groups in a similar manner to that discussed above for the north and south pull data and ID buses. The general configuration of the north and south push data buses are analogous to those presented above, wherein multiple cross-bar buses are connected to a set of horizontal bus lines. More particularly, the embodiment of north push data bus 146 shown in FIG. 5a employs a horizontal bus line set 500 including bus lines $500_0$, $500_1$, $500_2$, and $500_3$, while the embodiment of south pull ID bus 156 shown in FIG. 5b employs a horizontal bus line set 550 including bus lines $550_0$, $550_1$, $550_2$, and $550_3$.

Each of the north and south push data buses employ a two-stage arbitration scheme, including a sub-group arbitration stage and cluster arbitration stage. The sub-group arbitration stage is used to determine which member of the group is allowed access to the push data bus, while the cluster arbitration stage is used to determine which winning sub-group is allowed access to the cluster to which the master half of the transaction belongs.

In connection with the first level arbitration operations, a respective sub-group data multiplexer is provided for each sub-group. These include sub-group data multiplexers $502_0$, $502_1$, $502_2$, and $502_3$ for the north target sub-groups, and sub-group data multiplexers $552_0$, $552_1$, and $552_3$ for the south target sub-groups. In connection with the second level arbitration operations, a respective sub-group selection data multiplexer is provided to connect a winning sub-group to a corresponding cluster. These include sub-group selection data multiplexers 510A, 510B, 510C, and 510D for the north target sub-groups, and sub-group selection data multiplexers 560A, 560B, 560C, and 560D for the south target sub-groups.

Each of the horizontal bus lines is connected to each of the sub-group selection data multiplexers via respective sets of cross-bar bus lines. These include cross-bar bus line sets 512A, 512B, 512C, and 512D for horizontal bus line set 500 (FIG. 5a) and cross-bar bus line sets 562A, 562B, 562C, and 562D for horizontal bus line set 550 (FIG. 5b).

Figure 6A:
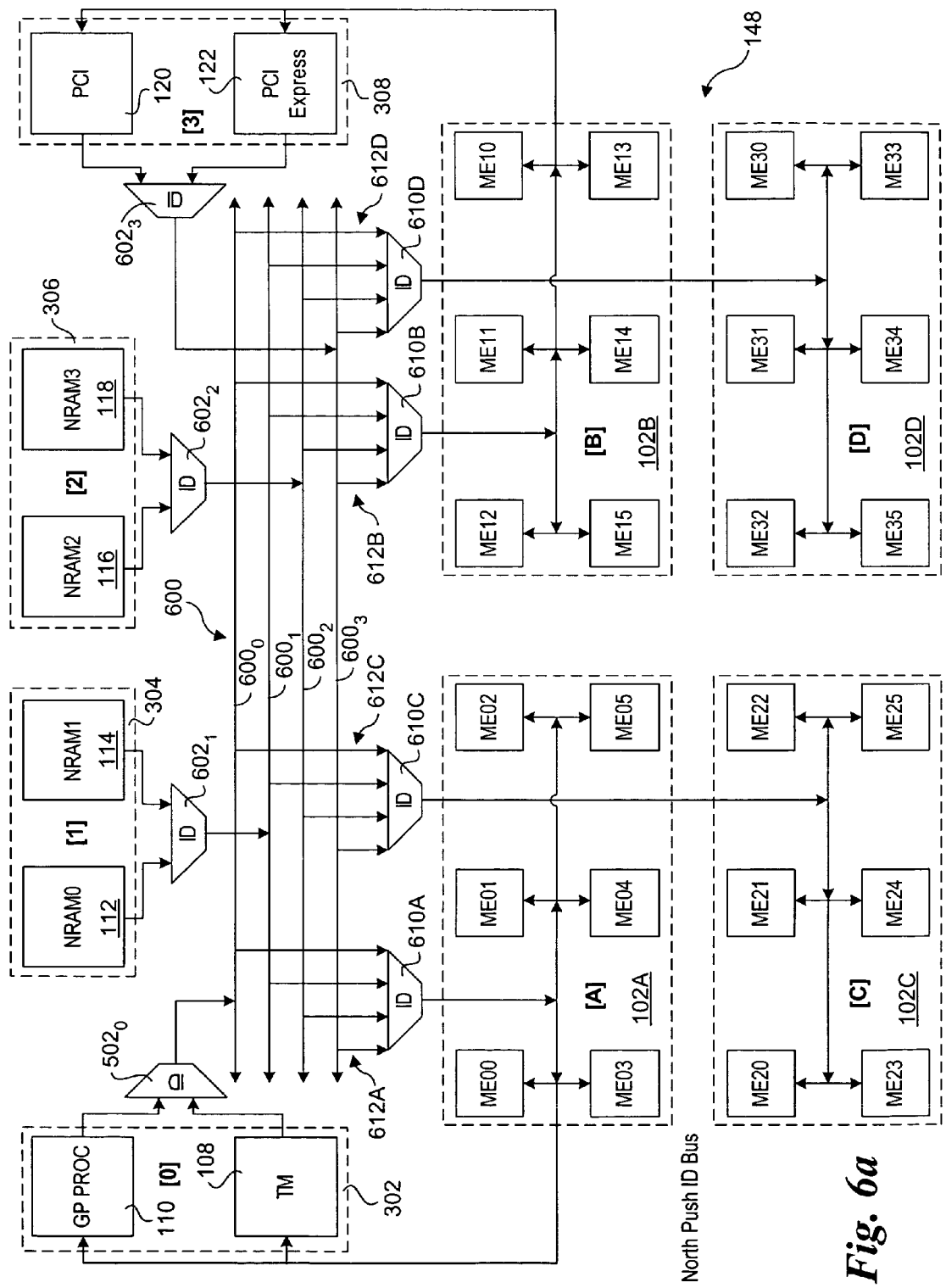
FIG. 6a is a schematic diagram illustrating details of a north push ID bus, according to one embodiment of the invention.
Figure 6B:
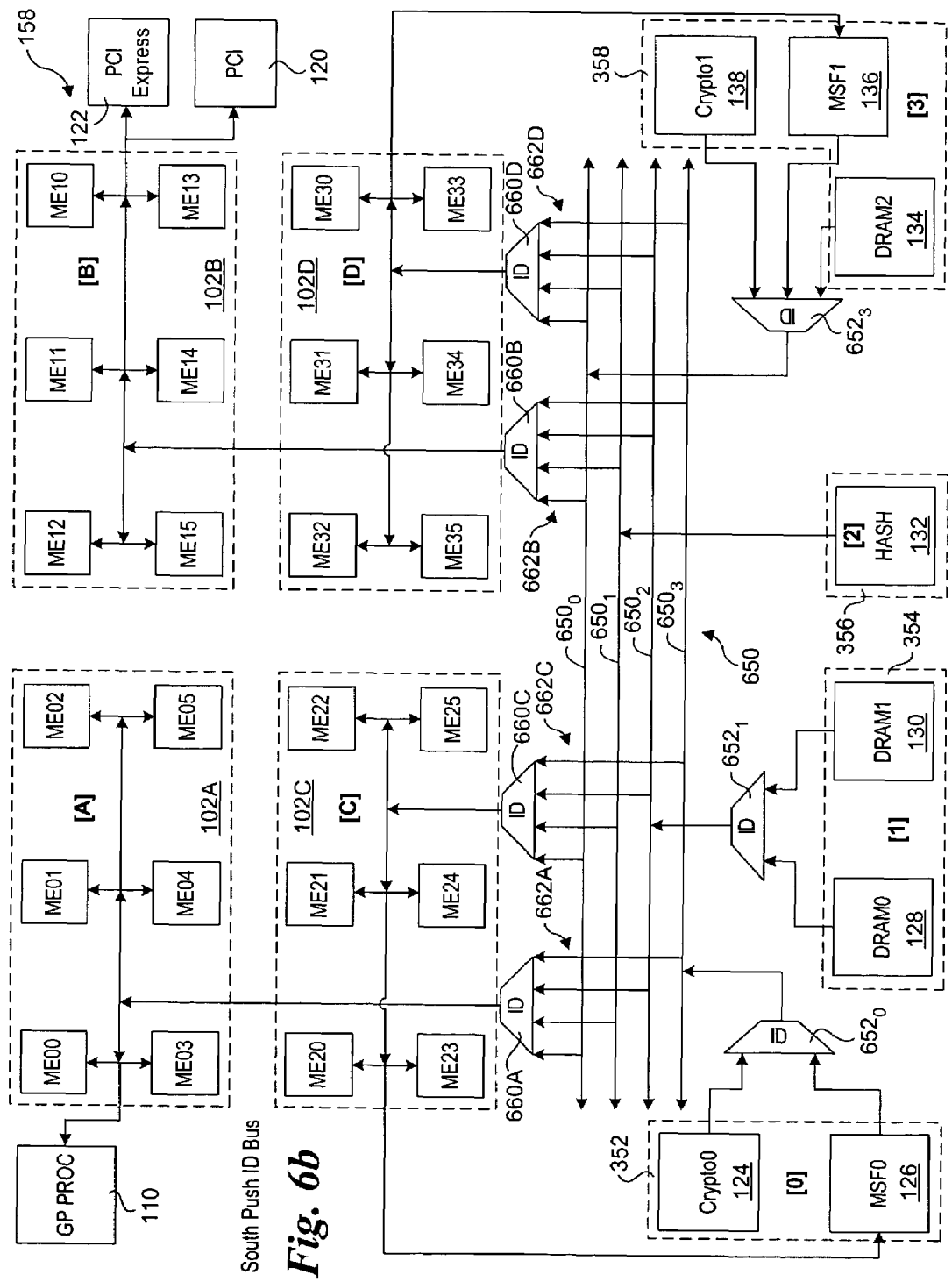
FIG. 6b is a schematic diagram illustrating details of a south push ID bus, according to one embodiment of the invention.

Exemplary embodiments of north and south push ID buses 148 and 158 are shown in FIGS. 6a and 6b, respectively. In the illustrated embodiments, the various targets are further grouped into sub-groups in a similar manner to that discussed above for the north and south push data buses. Generally, the sub-grouping used for the push data and ID bus sets should match, although this is not a strict requirement. As before, the general configuration of the north and south push ID buses employ multiple cross-bar buses that are connected to a set of horizontal bus lines. More particularly, the embodiment of north push ID bus 148 shown in FIG. 6a employs a horizontal bus line set 600 including bus lines $600_0$, $600_1$, $600_2$, and $600_3$, while the embodiment of south push ID bus 158 shown in FIG. 6b employs a horizontal bus line set 650 including bus lines $650_0$, $650_1$, $650_2$, and $650_3$.

Each of the north and south push ID buses employ a two-stage arbitration scheme, including a sub-group arbitration stage and cluster arbitration stage. The sub-group arbitration stage is used to determine which member of the group is allowed access to the push ID bus. The cluster arbitration stage is used to determine which winning sub-group is allowed access to the cluster to which the master half of the transaction belongs.

In connection with the first stage arbitration operations, a respective sub-group ID multiplexer is provided for each sub-group. These include sub-group ID multiplexers $602_0$, $602_1$, $602_2$, and $602_3$ for the north target sub-groups, and sub-group ID multiplexers $652_0$, $652_1$, and $652_3$ for the south target sub-groups. In connection with the second level arbitration operations, a respective sub-group selection ID multiplexer is provided to connect a winning sub-group to a corresponding cluster. These include sub-group selection ID multiplexers 610A, 610B, 610C, and 610D for the north target sub-groups, and sub-group selection ID multiplexers 660A, 660B, 660C, and 660D for the south target sub-groups.

Each of the horizontal bus lines is connected to each of the sub-group selection ID multiplexers via respective sets of cross-bar bus lines. These include cross-bar bus line sets 612A, 612B, 612C, and 612D for horizontal bus line set 600 (FIG. 6a) and cross-bar bus line sets 662A, 662B, 662C, and 662D for horizontal bus line set 650 (FIG. 6b).

During packet processing operations, various transaction requests will be made by various masters to various targets. For the following examples, read transaction requests and subsequent processing of granted requests are considered. The arbitration operations to support arbitration of read transaction requests is referred to herein as "Push" arbitration, and the requests are known as "push-data" (target read) transaction requests. The operations described below to support push-data transactions are generally illustrative of analogous "pull-data" (target write) transactions, except that pull data and pull ID buses having different configurations, as discussed above and shown herein.

Figure 7A:
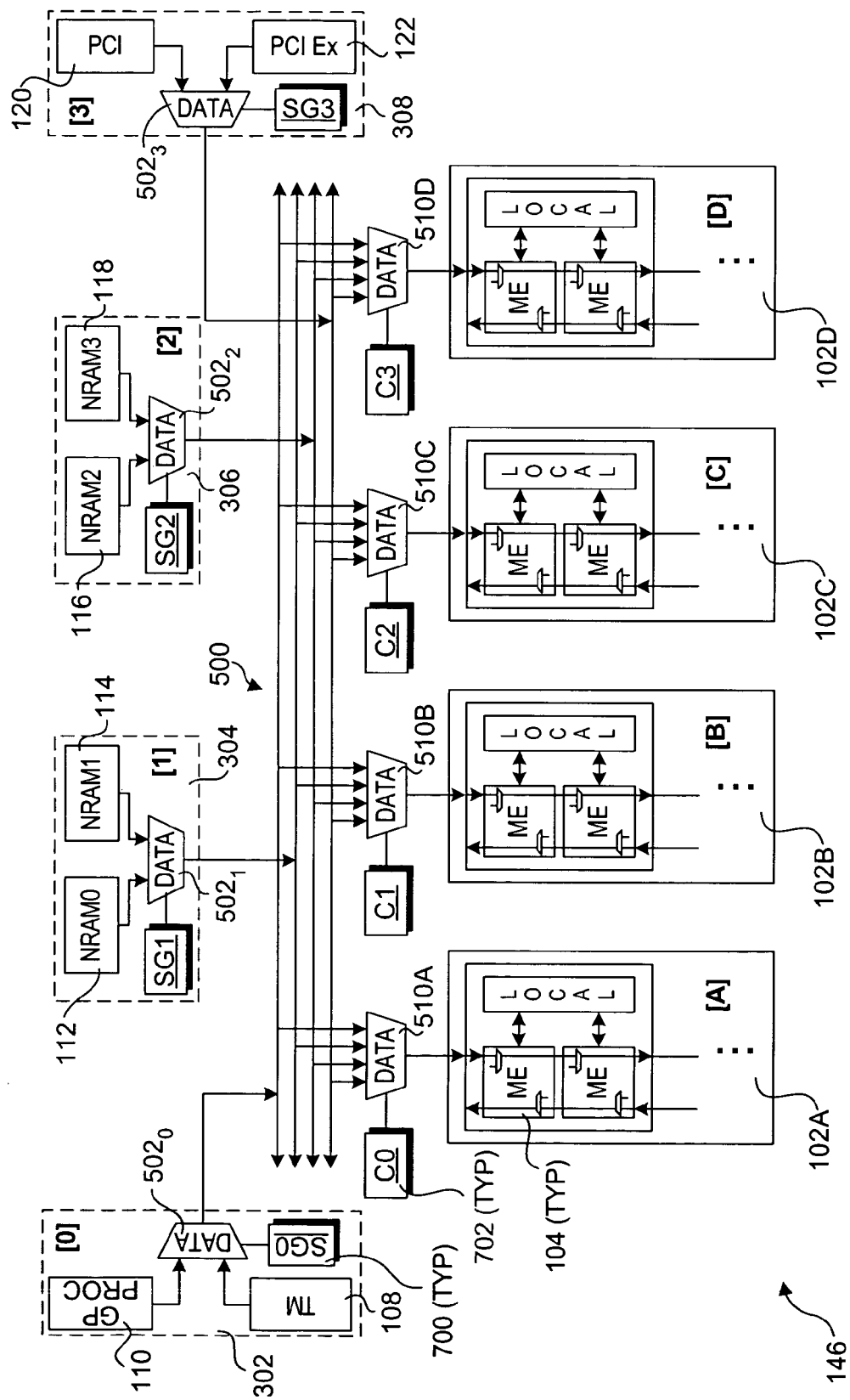
FIG. 7a is a schematic diagram showing further details of the network processor architecture of FIG. 1, including details of a pipelined push data bus with two-stage arbitration.
Figure 7B:
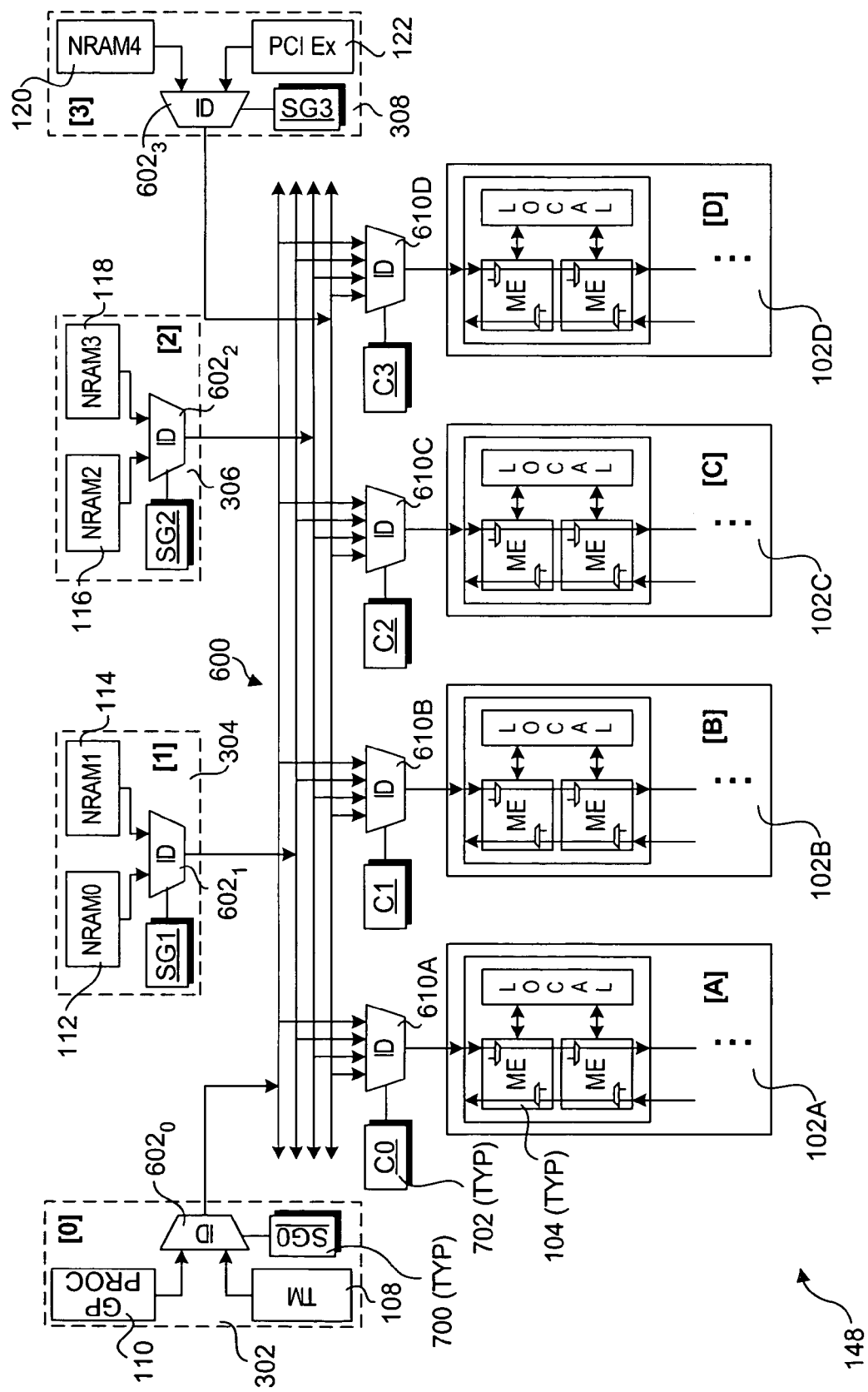
FIG. 7b is a schematic diagram showing further details of the network processor architecture of FIG. 7a, including details of a pipelined requester identification (ID) bus with two-stage arbitration.

In an aspect of some embodiments, bus contention issues are resolved using a two-stage arbitration scheme, wherein the first stage arbitrates between sub-groups and the second stage arbitrates between processing element clusters. For example, details of an embodiment of an exemplary two-stage arbitration scheme employed for the north push data and ID buses are shown in FIGS. 7a and 7b. Similar arbitration schemes may be used for the south push data and ID buses, as well as the north and south pull data and ID buses.

The north push data bus arbitration scheme of FIG. 7a employs a respective first-stage (sub-group) arbiter 700 (labeled SG0 for sub-group 302 (sub-group [0]), SG1 for sub-group 304 (sub-group [1]), SG2 for sub-group 306 (sub-group [2]), and SG3 for sub-group 308 (sub-group [3])), which is used to control the operation of sub-group selection data multiplexers $502_{1-4}$. Similarly, a respective second stage (cluster) arbiter 702 (labeled C0 for cluster 102A (cluster [A]), C1 for cluster 102B (cluster [B]), C2 for cluster 102C (cluster [C]), and C3 for cluster 102D (cluster [D])) is used to control operation of sub-group selection data multiplexers 510A-D.

FIG. 7b shows further details of the push ID bus infrastructure of one embodiment of network processor architecture 100. As with the push data bus, a respective first-stage (sub-group) arbiter 700 (e.g., SG0, SG1, SG2 and SG3) is used to control the operation of sub-group selection ID multiplexers $602_{1-4}$. Similarly, a respective second stage (cluster) arbiter 702 (e.g., C0, C1, C2, and C3) is used to control operation of sub-group selection ID multiplexers 610A-D.

Figure 8:
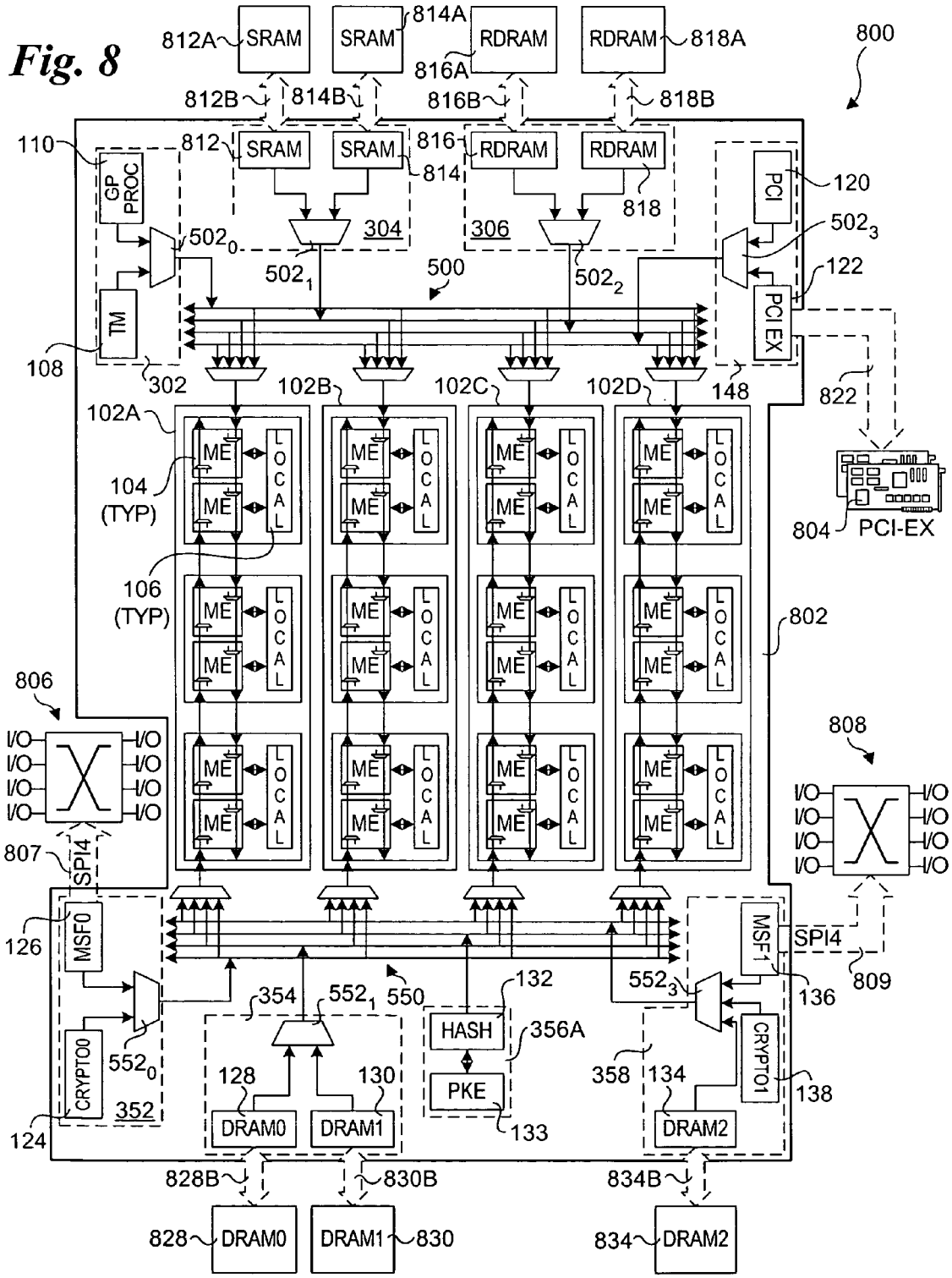
FIG. 8 is a schematic diagram of a network device including a network processor implementing the architecture of FIG. 1, according to one embodiment of the invention.

Network processors that implement architecture 100 of FIG. 1, and include support for the two-stage arbitration operations discussed above may be implemented in various network devices, such as, but not limited to, switches, line cards, routers, etc. FIG. 8 shows an exemplary architecture of a network device 800 including a network processor 802 that implements network processor architecture 100. (It is noted FIG. 8 only shows bus element corresponding to north push data bus 146 and south push data bus 148—it will be understood that network processor 802 further includes the other buses discussed above for network processor architecture 100). In general, like-numbered components in FIGS. 1 and 8 perform similar functions. In addition, network processor 802 includes SRAM control channels 812 and 814, RDRAM control channels 816 and 818, as well as a private key encryption (PKE) component 133 that is coupled to hash unit 132 and is a member of a sub-group 356A.

In the illustrated embodiment of FIG. 8, microengines 104 are grouped into sets of two microengines that share a common set of local resources 106. Local resources may typically include resources that are specific to a microengine (or pair of microengines in this case), such as a local memory, instruction cache, registers, etc. In other embodiments, microengines may be configured to share local resources in groups having more than two members, or they may be configured to have the own set of local resources on an individual basis.

As discussed above, the crossbar chassis configuration of network processor architecture 100 enables various masters (e.g., microengines 104) to access various targets via corresponding transactions requests. In some embodiments, some of the actual data or operations supported by the "effective" targets are provided on the network processor chip, while others are provided off-chip. For example, while an NRAM control channel may comprise a target (for the purpose of the foregoing discussion), the effective target is the actual NRAM store that is accessed via the NRAM control channel (since the control channel does not store any data by itself.

In the exemplary configuration shown in FIG. 8, the on-chip "effective" targets include traffic manager 108, general-purpose processor 110, cryptographic units 124 and 138, hash unit 132, and public key encryption unit 133. Meanwhile, various off-chip effective targets include external SRAM stores 812A and 814a, external RDRAM stores 816A and 818A, one or more PCI Express devices (e.g., expansion cards) 804, and external DRAM stores 828, 830, and 834. Each off-chip memory store is connected to its respective control channel by a respective interface. These include SRAM interfaces 812B and 814B, RDRAM interfaces 816B and 818B, DRAM interfaces 828B, 830B, and 834B, and PCI Express interface 822.

Network devices are used to perform packet-processing operations. One of the primary functions performed during packet processing is determining the next hop to which the packet is to be forwarded. A typical network device, such as a switch, includes multiple input and output ports. More accurately, the switch includes multiple input/output (I/O) ports, each of which may function as either an input or an output port within the context of forwarding a given packet. An incoming packet is received at a given I/O port (that functions as in input port), the packet is processed, and the packet is forwarded to its next hop via an appropriate I/O port (that functions as an output port). The switch includes a plurality of cross-connects known as the media switch fabric. The switch fabric connects each I/O port to the other I/O ports. Thus, a switch is enabled to route a packet received at a given I/O port to any of the next hops coupled to the other I/O ports for the switch.

The exemplary network device of FIG. 8 includes two sets of media switch fabrics 806 and 808. In one embodiment, media switch fabric 806 is connected to first media switch fabric interface 126 via a System Packet Interface Level 4 (SPI4) interface 807, while media switch fabric 808 is connected to second media switch fabric interface 140 via an SP4 interface 809.

In general, aspects of the foregoing embodiments may be implemented using programmed logic using semiconductor fabrication techniques. In addition, embodiments of the present description may be implemented within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A network device, comprising:
    a network processor including:
        a plurality of processing cores configured in a plurality of clusters;
        a plurality of targets, each of the targets comprising a sharable resource that is accessible to the plurality processing cores, the targets including a media switch fabric interface and a Peripheral Component Interconnect (PCI) Express interface;
        a chassis interconnect comprising a plurality of sets of bus lines connected between the plurality of clusters and the plurality of targets forming a crossbar interconnect, the sets of bus lines corresponding to a command bus, a pull data bus for target writes, and a push data bus for target reads; and
    multiplexer circuitry for each of the command bus, pull data bus, and push data bus to selectively connect a given cluster to a given target to enable commands and data to be passed between the given cluster and the given target;
    a media switch fabric, including cross-over connections between a plurality of input/output (I/O) ports via which packets are received at and forwarded from, coupled to the media switch fabric interface;
    a two-stage bus arbiter for arbitrating each of the command bus, pull data bus, and push data bus and coupled to control the multiplexer circuitry; and
    a PCI Express board, coupled to the PCI Express interface.

2. The network device of claim 1, further comprising:
    a dynamic random access memory (DRAM) control channel, comprising a target; and
    a DRAM store, coupled to the DRAM control channel.

3. The network device of claim 1, further comprising:
    a second media switch fabric interface, comprising a target; and
    a second media switch fabric, coupled to the second media switch fabric interface.

4. The network device of claim 1, further comprising:
    a pull identification (ID) bus, comprising a plurality of sets of bus lines connected between the plurality of clusters and the plurality of targets forming a crossbar interconnect; and
    a push identification (ID) bus, comprising a plurality of sets of bus lines connected between the plurality of clusters and the plurality of targets forming a crossbar interconnect; and
    multiplexer circuitry for each of the command bus, pull data bus, and push data bus to selectively connect a given cluster to a given target to enable commands and data to be passed between the given cluster and the given target.

5. The network device of claim 4, wherein the multiplexer circuitry for the push data and push ID buses includes a plurality of push data and push ID multiplexers, and wherein the two-stage arbiter is operatively coupled to the targets, push data multiplexers, and push ID multiplexers, to arbitrate granting of pull data transaction requests issued from the plurality of processing cores to the plurality of targets via the chassis interconnect.

6. The network apparatus of claim 5 wherein selected targets are grouped into sub-groups, and wherein the two-stage arbiter comprises:
    a first arbitration stage comprising a sub-group arbiter that arbitrates transaction requests issued by a target in a corresponding sub-group; and
    a second arbitration stage comprising a cluster arbiter that arbitrates winning transaction requests issued to the cluster arbiter from one or more sub-group arbiters.

7. An apparatus, comprising:
    a plurality of masters configured in a plurality of clusters;
    a plurality of targets, each of the targets comprising a sharable resource that is accessible to the plurality masters;
    an interconnect, comprising a plurality of sets of bus lines connected between the plurality of clusters and the plurality of targets forming crossbar interconnects, the sets of bus lines corresponding to a command bus, a pull data bus for target writes, and a push data bus for target reads;
    multiplexer circuitry coupled to each of the command bus, pull data bus, and push data bus to selectively connect a given cluster to a given target to enable commands and data to be passed between the given cluster and the given target; and
    a two-stage arbiter coupled to the multiplexer circuitry to arbitrate each of the command bus, the pull data bus, and the push data bus,
    wherein selected targets are grouped into sub-groups, each sub-group including a respective sub-group multiplexer for each of the push data bus and the pull data bus that enables the targets in the sub-group to be selectively connected to the plurality of clusters via the interconnect.

8. The apparatus of claim 7, further comprising a pull data request identification (ID) bus, comprising a plurality of sets of bus lines connected between the plurality of clusters and the plurality of targets forming a crossbar interconnect.

9. The apparatus of claim 7, further comprising a push data request identification (ID) bus, comprising a plurality of sets of bus lines connected between the plurality of clusters and the plurality of targets forming a crossbar interconnect.

10. The apparatus of claim 7, wherein a first portion of the targets are associated with a first plurality of sets of bus lines corresponding to a first instance of the command bus, pull data bus, and push data bus, and wherein a second portion of the targets are associated with a second plurality of sets of bus lines corresponding to a second instance of the command bus, pull data bus, and push data bus.

11. The apparatus of claim 7, wherein the apparatus comprises a processor, and the plurality of masters includes a plurality of processor core elements.

12. The apparatus of claim 7, further including bus circuitry to enable a target to selectively operate as both a target and a master.

13. The apparatus of claim 12, further comprising a general-purpose processor that may be selectively operated as both a target and a master.

14. The apparatus of claim 12, further comprising a traffic manager that may be selectively operated as both a target and a master.

15. The apparatus of claim 12, further comprising one of a Peripheral Component Interconnect (PCI) interface and a PCI Express interface that may be selectively operated as both a target and a master.

16. The apparatus of claim 7, wherein one of the targets comprises a media switch fabric interface.

17. The apparatus of claim 7, wherein one of the targets comprises a memory controller.

18. The apparatus of claim 7, wherein the apparatus comprises an integrated circuit (IC) chip, and wherein the plurality of targets are disposed proximate to a periphery of the IC chip while the plurality of clusters of masters are disposed towards a center portion of the IC chip.

19. The apparatus of claim 7, further comprising at least one pipelined bus for each cluster via which data may be transferred between masters in a cluster.

20. An apparatus, comprising:
- a plurality of masters configured in a plurality of clusters;
- a plurality of targets, each of the targets comprising a sharable resource that is accessible to the plurality masters;
- an interconnect means, comprising a plurality of sets of bus lines connected between the plurality of clusters and the plurality of targets forming a crossbar interconnect, the sets of bus lines corresponding to a command bus, a pull data bus for target writes, and a push data bus for target reads;
- multiplexer means for selectively connecting a given cluster of the clusters to a given target of the targets for each of the bus, pull data, and push data buses to enable commands and data to be passed between the given cluster and the given target,
- two-stage bus arbitration means for arbitrating each of the command bus, pull data bus, and push data bus and coupled to control the multiplexer means,
- wherein selected targets are grouped into sub-groups, each sub-group including a respective sub-group multiplexer and bus arbitration means for each of the push data bus and the pull data bus for enabling the targets in the sub-group to be connected to the plurality of clusters via the chassis interconnect means.

21. The apparatus of claim 20, wherein the interconnect means includes a first portion and a second portion, and wherein the plurality of targets are partitioned into first and second sets of targets, the first set of targets being connected to the plurality of clusters via the first portion of the interconnect means, the second set of targets being connected to the plurality of clusters via the second portion of the interconnect means.

22. The apparatus of claim 20, wherein the apparatus comprises a network processor means, and the plurality of masters includes a plurality of packet-processing means.

23. The apparatus of claim 20, further comprising means for enabling a target to selectively operate as both a target and a master.

24. The apparatus of claim 20, further comprising means for transferring commands and data to and from masters with each cluster.

25. The apparatus of claim 20, wherein one of the targets comprises a media switch fabric interface means.

26. The apparatus of claim 7, wherein one of the targets comprises a memory controller means.

* * * * *